(12) United States Patent
Ohyama

(10) Patent No.: US 9,601,093 B2
(45) Date of Patent: Mar. 21, 2017

(54) RESTRAINT ITEM FOR ENDPIN OF MUSICAL INSTRUMENT AND STAND FOR SPEAKER

(71) Applicant: Heiichiro Ohyama, Goleta, CA (US)

(72) Inventor: Heiichiro Ohyama, Goleta, CA (US)

( * ) Notice: Subject to any disclaimer, the term of this patent is extended or adjusted under 35 U.S.C. 154(b) by 0 days.

(21) Appl. No.: 14/910,351

(22) PCT Filed: Aug. 9, 2013

(86) PCT No.: PCT/JP2013/071635
§ 371 (c)(1),
(2) Date: Feb. 5, 2016

(87) PCT Pub. No.: WO2015/019486
PCT Pub. Date: Feb. 12, 2015

(65) Prior Publication Data
US 2016/0189690 A1    Jun. 30, 2016

(51) Int. Cl.
*G10D 3/00* (2006.01)
*F16F 15/08* (2006.01)

(52) U.S. Cl.
CPC ............. *G10D 3/003* (2013.01); *F16F 15/08* (2013.01)

(58) Field of Classification Search
CPC ...................................................... G10D 3/003
See application file for complete search history.

(56) References Cited

U.S. PATENT DOCUMENTS

| 1,288,179 | A | * | 12/1918 | Poehland | ............... | G10D 3/003 |
| | | | | | | 84/280 |
| 2,974,556 | A | * | 3/1961 | Fawick | .................. | G10D 3/003 |
| | | | | | | 84/280 |
| 3,160,050 | A | * | 12/1964 | Klein | ..................... | G10D 3/003 |
| | | | | | | 84/280 |

(Continued)

FOREIGN PATENT DOCUMENTS

| JP | H06-025891 U | 4/1994 |
| JP | H07-016991 U | 3/1995 |

(Continued)

OTHER PUBLICATIONS

International Search Report received for PCT Patent Application No. PCT/JP2013/071635 mailed on Nov. 26, 2013, 4 pages (2 pages of English Translation of International Search Report, 2 pages of International Search Report).

*Primary Examiner* — Robert W Horn
(74) *Attorney, Agent, or Firm* — East West Law Group; Heedong Chae

(57) ABSTRACT

An endpin support 1 as an example of a musical instrument support to which the present invention is applied includes a lower plate member 2, an upper plate member 3, middle plate members 4, and a load receiving member 5. The lower plate member 2 is a portion that vibrates by resonating with sounds of a musical instrument and spreads vibrancy of the sounds. The lower plate member 2 and the upper plate member 3 are joined at a position at which their one end sides are aligned by two middle plate members 4 to form a (Continued)

main body portion 6 that receives a load when supporting an endpin. The two middle plate members 4 are provided at positions of both ends of the lower plate member 2, and a space is formed between the lower plate member 2 and the upper plate member 3.

11 Claims, 12 Drawing Sheets

(56) References Cited

U.S. PATENT DOCUMENTS

| | | | | |
|---|---|---|---|---|
| 3,598,011 | A * | 8/1971 | Henkle | G10D 3/003 84/280 |
| 4,018,129 | A * | 4/1977 | Hollander | G10D 3/18 84/280 |
| 5,003,858 | A * | 4/1991 | Rowell | G10D 3/003 84/280 |
| 5,069,102 | A * | 12/1991 | Wolf | G10D 3/003 248/188.9 |
| 5,197,707 | A * | 3/1993 | Kohan | H04R 1/026 248/562 |
| 5,905,804 | A * | 5/1999 | Lee | H04R 1/026 248/638 |
| 6,127,611 | A * | 10/2000 | VansEvers | G10D 3/02 84/294 |
| 6,696,626 | B1 * | 2/2004 | Pagenkopf | G10D 3/003 84/280 |
| 6,830,125 | B1 * | 12/2004 | Bizlewicz | F16F 15/021 181/207 |
| 7,290,759 | B1 * | 11/2007 | Lavrencik | F16F 15/08 267/140.11 |
| 7,449,625 | B2 * | 11/2008 | Johnson | G10D 3/003 482/121 |
| 7,743,882 | B2 * | 6/2010 | Vu | F16F 1/374 181/207 |
| 7,982,111 | B2 * | 7/2011 | Fuller | G10D 3/003 84/173 |
| 8,735,702 | B1 * | 5/2014 | Miles | A61F 2/013 84/327 |
| 2009/0057526 | A1 * | 3/2009 | Janis | H04R 1/025 248/638 |
| 2016/0189690 | A1 * | 6/2016 | Ohyama | G10D 3/003 84/327 |

FOREIGN PATENT DOCUMENTS

| | | |
|---|---|---|
| JP | H09-215075 A | 8/1997 |
| JP | 2006-030436 A | 2/2006 |
| JP | 2007-139876 A | 6/2007 |
| JP | 3153830 U | 9/2009 |
| WO | 2011/080583 A2 | 7/2011 |

* cited by examiner

RESTRAINT ITEM FOR ENDPIN OF MUSICAL INSTRUMENT AND STAND FOR SPEAKER

CROSS REFERENCE TO RELATED APPLICATIONS

This patent application is a U.S. national stage application under 35 U.S.C. §371 of International Patent Application No. PCT/JP2013/071635 filed on Aug. 9, 2013. The International Application was published in Japanese on Feb. 12, 2015, as International Publication No. WO 2015/019486 A1 under PCT Article 21(2).

TECHNICAL FIELD

The present invention relates to a musical instrument support and a sound source body support. In detail, the present invention relates to a musical instrument support and a sound source body support which are hardly influenced by a floor surface while securely fixing a musical instrument and a sound source body, and can sufficiently bring out vibrancy of sounds produced by the musical instrument itself.

BACKGROUND ART

At a bottom portion of a large-sized musical instrument such as a cello or a contrabass, a rod-shaped component called an endpin that is stood on a floor to support the musical instrument is present. An endpin supports a musical instrument with a tip end stuck into a floor, and transmits vibrations of sounds produced from the musical instrument to the floor.

Many endpins have a pointed tip end because of their characteristic of being stuck into a floor. In particular, an endpin of a cello is used by sticking a pointed tip end into a floor. Therefore, the floor surface is damaged in some cases.

To prevent the floor surface from being damaged by an endpin, a rubber cap and a dedicated stopper to be attached to a tip end of an endpin have been used. A cap and a stopper are used not only to cover a tip end of an endpin but also as an antislip device to fix a musical instrument to a floor surface.

However, when a rubber cap or a dedicated stopper is used, vibrations of sounds produced by the musical instrument are directly absorbed by the cap or stopper via the endpin, and as a result, vibrancy of the sounds is significantly reduced.

In addition, a rubber cap and a dedicated stopper are so small that they can be attached to a tip end of an endpin. Therefore, their fixing power is weak and cannot sufficiently support a musical instrument.

In such circumstances, musical instrument supports using endpins as components that can effectively transmit vibrations of sounds produced by musical instruments to a floor material without diminishing the vibrations of the sounds exist, and for example, a musical instrument support described in Patent Literature 1 is proposed.

Here, Patent Literature 1 describes a musical instrument support 100 as shown in FIG. 12(a) and FIG. 12(b). The musical instrument support 100 has a substantially discoid main body 101. The main body 101 includes a receiving member 103 with which a tip end of an endpin 102 of a cello or the like comes into contact, and a pressure-contact pin 104 that is disposed below the receiving member 103 and is brought into pressure-contact with a floor surface.

Between the receiving member 103 and the pressure-contact pin 104, a spring coil 105 that biases the pressure-contact pin 104 downward is provided. When the tip end of the endpin 102 is abutted against the receiving member 103, sounds of a cello are transmitted to the floor surface via the receiving member 103, the spring coil 105, and the pressure-contact pin 104 without being diminished.

CITATION LIST

Patent Literature

Patent Literature 1: Japanese Published Unexamined Patent Application No. 2007-139876

SUMMARY OF THE INVENTION

Problems to be Solved by the Invention

However, the musical instrument support described in Patent Literature 1 is shaped so that the periphery of the receiving member with which the endpin comes into contact is surrounded by the main body, and vibrancy of sounds of a musical instrument may be absorbed by the main body and deteriorated.

In addition, since the main body of the musical instrument support has a substantially discoid shape, it cannot securely receive the load applied when supporting a musical instrument, and cannot sufficiently fix the musical instrument.

In addition, conventional endpins including the musical instrument support described in Patent Literature 1 are intended to spread vibrations of sounds via a floor surface on which the endpin is installed by transmitting the sounds to the floor surface. That is, by vibrating the material of the floor surface, vibrancy of sounds of a musical instrument itself is transmitted to the floor surface.

However, vibrations of a material of a floor surface are easily influenced by the surrounding environment, and vibrancy of sounds is hardly transmitted in some situations. For example, in a case where a plurality of players are present on a floor surface into which the endpin is stuck, the weight of the players is applied on the floor surface. As a result, the floor surface hardly vibrates, and even via the endpin or the support, vibrancy of sounds cannot be transmitted.

That is, the endpin is a tool for spreading vibrancy of sounds to a floor surface. However, vibrancy of sounds does not spread in a target floor surface, and original sounds of a musical instrument cannot be felt. In other words, in order to maximally bring out vibrancy of sounds of a musical instrument, a situation in which the musical instrument is influenced by the floor surface as little as possible is needed. However, there are no endpins or endpin supports that realize this situation.

The present invention was made in view of the above-described circumstances, and an object thereof is to provide a musical instrument support and a sound source body support which are hardly influenced by a floor surface while securely fixing a musical instrument and a sound source body, and can sufficiently bring out vibrancy of sounds produced by the musical instrument itself.

Means for Solving the Problems

In order to attain the above-described object, a musical instrument support according to the present invention includes a first member, a second member that is provided so as to have a predetermined gap with the first member and can fix an endpin, third members that are in contact with the first member and the second member and disposed in a portion of the gap between the first member and the second member, a first bottom portion member with elasticity provided on a side of the first member opposite to the third members, a load support portion connected to the second member, and a second bottom portion member with elasticity provided on the load support portion.

Here, by providing the second member so as to have a predetermined gap with the first member, vibrancy of sounds of a musical instrument can be prevented from being easily deteriorated. That is, a space is formed between the first member and the second member, and absorption of sounds by the members can be reduced.

In addition, by the second member that can fix an endpin, an endpin of a musical instrument can be fixed.

Since the third members are in contact with the first member and the second member and disposed in a portion of the gap between the first member and the second member, the second member can be supported while a space is left formed between the first member and the second member.

Since the first bottom portion member is provided on a side of the first member opposite to the third members, vibrancy of sounds of a musical instrument can be prevented from being easily deteriorated. That is, a space is formed between the first member and the floor surface, and accordingly, absorption of sounds by the first member and the floor surface can be reduced.

Since the first bottom portion member is provided on a side of the first member opposite to the third members, the first member is enabled to vibrate by resonating with sounds of a musical instrument, and accordingly, vibrancy of the sounds can be spread.

Since the first bottom portion member has elasticity, the musical instrument support can be fixed to a floor surface. That is, a force of the musical instrument support in a loaded state to slip on the floor surface can be absorbed by the first bottom portion member.

In addition, since the first bottom portion member has elasticity, unnecessary vibrations to be transmitted from the floor surface side to the musical instrument support can be absorbed.

By the load support portion connected to the second member, the musical instrument support can be fixed by being latched onto a leg of a chair on which a player sits. That is, by bringing the load support portion into contact with a leg of the chair and positioning the second member in front of the chair, a movement of the musical instrument support to slip forward on the floor surface is suppressed by the weights of a player himself/herself and the chair.

Since the second bottom portion member is provided on the load support member, vibrancy of sounds of a musical instrument can be prevented from being easily deteriorated. That is, a space is formed between the load support portion and the floor surface, and accordingly, absorption of sounds by the load support portion and the floor surface can be reduced.

In addition, since the second bottom portion member has elasticity, the musical instrument support can be fixed to a floor surface. That is, a force of the musical instrument support in a loaded state to slip on the floor surface can be absorbed by the second bottom portion member.

In addition, since the second bottom portion member has elasticity, unnecessary vibrations to be transmitted from the floor surface side to the musical instrument support can be absorbed.

By the first bottom portion member provided on the side of the first member opposite to the third members and the second bottom portion member provided on the load support portion, a space can be formed between the first member and the floor surface. That is, a contact area between the first member and the floor surface is minimized and influence from the floor surface side that hardly resonates sounds is reduced, and original vibrancy of sounds of a musical instrument can be easily brought out.

When an inner member in contact with the first member and the second member is provided, the second member is supported by the inner member, so that excessive warp of the second member can be suppressed. That is, excessive warp of the second member that received vibrations of sounds from an endpin can be reduced, and ease of playing can be improved.

When an inner member that is in contact with the first member and the second member and is movable in the gap between the first member and the second member is provided, the volume of the space formed between the first member and the second member can be changed. That is, the manner of vibrancy of sounds can be changed, and the vibrancy can be adjusted to vibrancy suiting a player's preference.

In a case where an angle of a connection position between the second member and the load support portion is variable, the orientation of the second member can be freely changed, and a position to fix an endpin of the second member can be adjusted to a position suiting a player's preference.

In a case where side plate members that are substantially parallel to the first member and have a length substantially equal to the length of the first member, and are connected to the first member, the second member, and the third members, are provided, the space formed between the first member and the second member can be covered by the side plate members. Accordingly, the side plate members are enabled to vibrate by resonating with sounds of a musical instrument, so that vibrancy of the sounds can be further spread.

In a case where the second member has a recess in which an endpin can fit, the endpin is fixed by the recess as well, so that a musical instrument can be further securely fixed.

In a case where the first member, the second member, and the load support portion are formed into pillar shapes, the structure of the musical instrument support can be made stable. The pillar shapes mentioned here are shapes including both of columnar shapes and prismatic shapes.

In order to attain the above-described object, a sound source body support according to the present invention includes a first member, a second member which is provided so as to have a predetermined gap with the first member, and on which a sound source body can be placed, third members that are in contact with the first member and the second member and disposed in a portion of the gap between the first member and the second member, an inner member that is in contact with the first member and the second member and is movable in the gap between the first member and the second member, and a bottom portion member with elasticity provided on a side of the first member opposite to the third members.

Here, by providing the second member so as to have a predetermined gap with the first member, vibrancy of sounds of a sound source body can be prevented from being easily deteriorated. That is, a space is formed between the first member and the second member, and accordingly, absorption of sounds by the members can be reduced.

By the second member on which a sound source body can be placed, a sound source body can be placed on the second member. The sound source body mentioned here is an object including not only acoustic instruments such as a speaker but also instruments that produce sounds such as musical instruments.

In addition, since the third members are in contact with the first member and the second member and disposed in a portion of the gap between the first member and the second member, the second member can be supported while a space is left formed between the first member and the second member.

Due to contact of the inner member with the first member and the second member, the inner member supports the second member, and excessive warp of the second member can be reduced. That is, excessive warp of the second member due to vibrations of sounds can be reduced, and vibrations to be transmitted from the second member to the sound source body side can be reduced, and accordingly, generation of noise due to vibrations can be prevented from easily occurring.

Since the inner member is in contact with the first member and the second member and is movable in the gap between the first member and the second member, the volume of the space formed between the first member and the second member can be changed. That is, the manner of vibrancy of sounds can be changed and adjusted to vibrancy suiting a user's preference.

Since the bottom portion member is provided on a side of the first member opposite to the third members, vibrancy of sounds of a musical instrument can be prevented from being easily deteriorated. That is, a space is formed between the first member and a floor surface, and absorption of sounds by the first member and the floor surface can be reduced.

In addition, since the bottom portion member is provided on a side of the first member opposite to the third members, the first member is enabled to vibrate by resonating with sounds of a musical instrument, and accordingly, vibrancy of the sounds can be spread.

Since the bottom portion member has elasticity, a sound source body support can be fixed to a floor surface. That is, the sound source body can be prevented from being easily displaced on the floor surface.

In addition, since the bottom portion member has elasticity, unnecessary vibrations to be transmitted from the floor surface side to the sound source body support can be absorbed.

Effects of the Invention

A musical instrument support according to the present invention is hardly influenced by a floor surface while securely fixing a musical instrument, and can sufficiently bring out vibrancy of sounds produced by the musical instrument itself.

A sound source body support according to the present invention is hardly influenced by a floor surface while securely fixing a sound source body, and can sufficiently bring out vibrancy of sounds produced by the sound source body itself.

BEST MODE FOR CARRYING OUT THE INVENTION

Hereinafter, embodiments of the present invention relating to a musical instrument support are described with reference to the drawings for understanding of the present invention.

Figure 1:
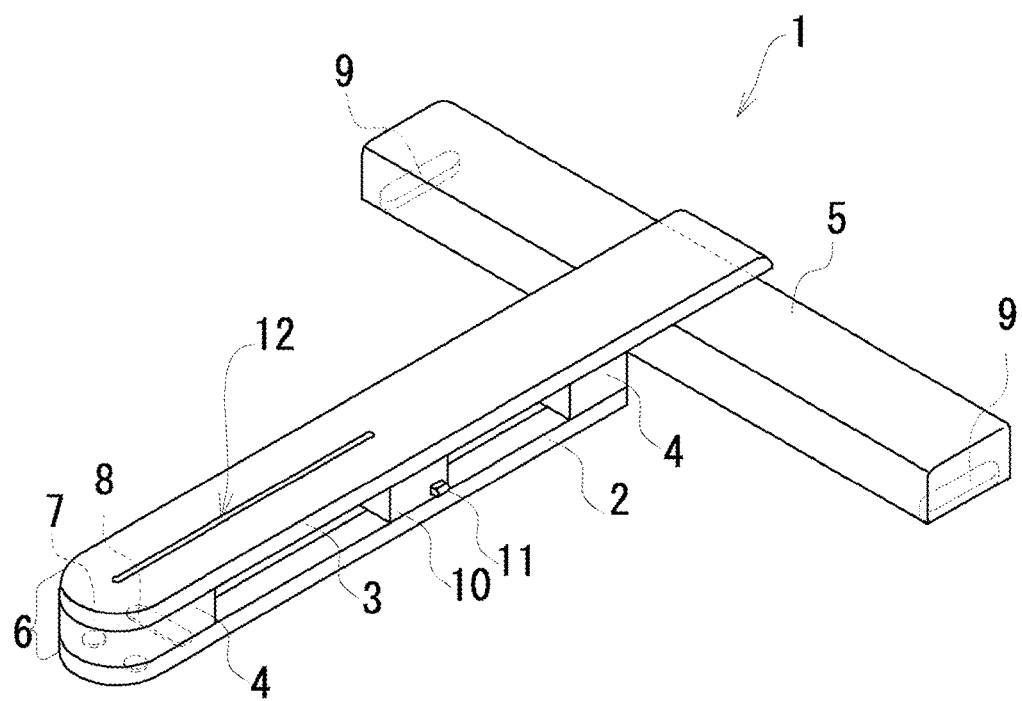
FIG. 1 is a schematic perspective view showing an example of a musical instrument support to which the present invention is applied.
Figure 4:
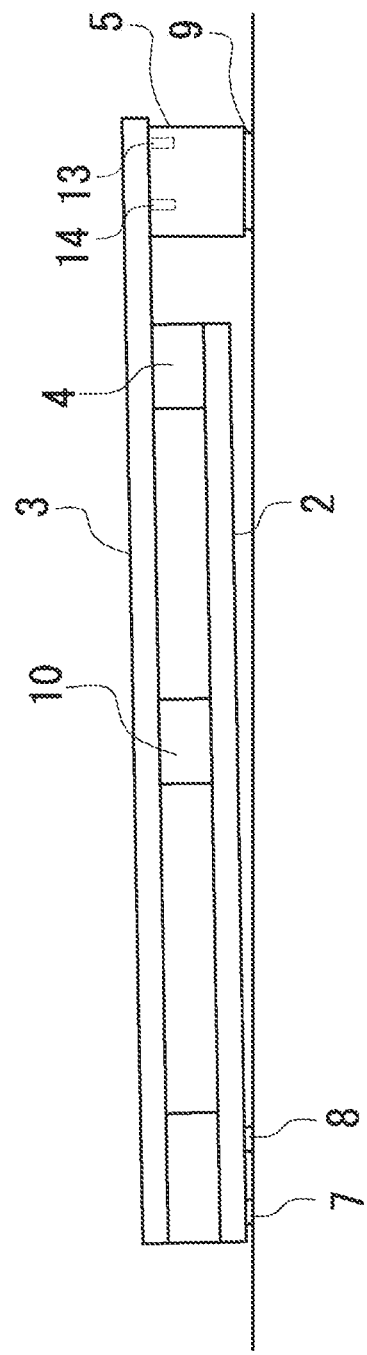
FIG. 4 is a schematic side view of the musical instrument support viewed from the side.
Figure 5:
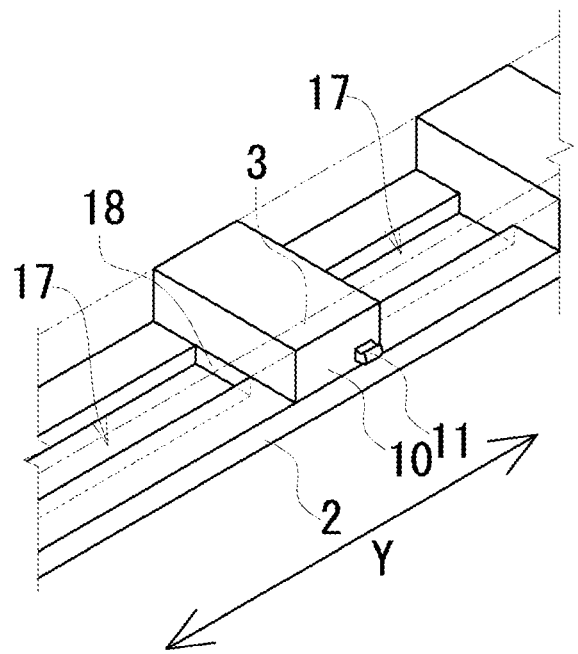
FIG. 5 is a schematic perspective view showing a peripheral structure and movement of a vibrancy adjuster.

FIG. 1 is a schematic perspective view showing an example of a musical instrument support to which the present invention is applied. FIG. 2(a) is a schematic side view showing a structure of the other end side of an upper plate member, FIG. 2(b) is a schematic plan view showing a position of a hole of a load receiving member, and FIG. 2(c) is a schematic plan view showing movement of a main body portion. FIG. 3(a) is a schematic view showing antislip portions of a lower plate member, and FIG. 3(b) is a schematic view showing antislip portions of the load receiving member. FIG. 4 is a schematic side view of the musical instrument support viewed from the side. FIG. 5 is a schematic perspective view showing a peripheral structure and movement of a vibrancy adjuster. FIG. 6(a) is a schematic view showing a case where an endpin is fixed into a recess, FIG. 6(b) is a schematic view showing a double hole, and FIG. 6(c) and FIG. 6(d) are schematic views showing cases where an endpin is fixed into the double hole. FIG. 7 is a schematic side view showing a musical instrument support using a replaceable endpin receiving member. FIG. 8(a) is a schematic side view of a state where a replaceable endpin receiving member is used, and FIG. 8(b) is a plan view of the replaceable endpin receiving member viewed from above. FIG. 9 is a schematic perspective view showing another example of a musical instrument support to which the present invention is applied.

Here, as shown in FIG. 1, the endpin support 1 as an example of a musical instrument support to which the present invention is applied includes a lower plate member 2, an upper plate member 3, middle plate members 4, and a load receiving member 5.

The lower plate member 2 is a portion that vibrates by resonating with vibrations of sounds of a musical instrument, and spreads vibrancy of the sounds. The lower plate member 2 and the upper plate member 3 are joined at a position at which their one end sides are aligned by two middle plate members 4 to form a main body portion 6 of the endpin support 1. The two middle plate members 4 are provided at the positions of both ends of the lower plate member 2, and a space is formed between the lower plate member 2 and the upper plate member 3.

The upper plate member 3 is longer than the lower plate member 2, and is shaped so that the other end side of the upper plate member 3 projects. The lower plate member 2, the upper plate member 3, and the middle plate members 4 are formed so as to have widths in the short side direction substantially equal to one another.

The load receiving member 5 is a portion to be brought into contact with a leg of a chair on which a player of a musical instrument sits to fix the endpin support 1. To a substantially central region of the load receiving member 5, the upper plate member 3 is attached so as to become substantially orthogonal to the load receiving member 5. A space is formed between the load receiving member 5 and the lower plate member 2 and the middle plate members 4.

The lower plate member 2, the upper plate member 3, the middle plate members 4, and the load receiving member 5 are made of wood.

Here, the lower plate member 2 and the upper plate member 3 do not necessarily have to be joined at a position at which their one end sides are aligned by the two middle plate members 4. However, from the point that the appearance is improved and the point that projecting portions are eliminated and safety during use is improved, the lower plate member 2 and the upper plate member 3 are preferably joined at a position at which their one end sides are aligned by the two middle plate members 4.

The main body portion 6 of the endpin support 1 does not necessarily have to be formed by joining the lower plate member 2 and the upper plate member 3 by the middle plate members 4. For example, the main body portion 6 may be formed by integrally forming the lower plate member 2, the upper plate member 3, and the middle plate members 4.

The two middle plate members 4 do not necessarily have to be provided at the positions of both ends of the lower plate member 2. However, from the point that the volume of the space between the lower plate member 2 and the upper plate member 3 is increased and the effect of making vibrancy of sounds less likely to be deteriorated by the members can be increased, the two middle plate members 4 are preferably provided at the positions of both ends of the lower plate member 2.

The lower plate member 2, the upper plate member 3, and the middle plate members 4 do not necessarily have to be formed so as to have widths in the short side direction substantially equal to one another. However, from the point that the appearance is improved and the point that projecting portions are eliminated and safety during use is improved, the lower plate member 2, the upper plate member 3, and the middle plate members 4 are formed so as to have widths in the short side direction substantially equal to one another.

The upper plate member 3 does not necessarily have to be formed to be longer than the lower plate member 2, and a space does not necessarily have to be formed between the load receiving member 5 and the lower plate member 2 and the middle plate members 4. However, when a player uses a chair shaped like, for example, a folding chair, the front legs of which are connected together by a rod member substantially parallel to a floor surface, the endpin support 1 can be used by fitting the portion of the rod member of the folding chair to the portion of the space. Therefore, it is preferable that the upper plate member 3 is formed to be longer than the lower plate member 2, and that a space is formed between the load receiving member 5 and the lower plate member 2 and the middle plate members 4.

The upper plate member 3 does not necessarily have to be attached to the load receiving member 5. For example, a structure in which the upper plate member 3 and the load receiving member 5 are integrally formed is also possible.

The upper plate member 3 does not necessarily have to be attached to the substantially central region of the load receiving member 5. However, from the point that when the endpin support 1 is brought into contact with a leg of a chair, the main body portion 6 is positioned directly in front of a player, and this improves usability, the upper plate member 3 is preferably attached to the substantially central region of the load receiving member 5.

The lower plate member 2, the upper plate member 3, the middle plate members 4, and the load receiving member 5 do not necessarily have to be made of wood. However, from the point that sound quality of a musical instrument having a main body made of wood such as a cello is hardly changed, the lower plate member 2, the upper plate member 3, the middle plate members 4, and the load receiving member 5 are preferably made of wood.

As shown in FIG. 1, on a bottom surface at one end side of the lower plate member 2, antislip members 7 and an antislip member 8 made of rubber to fix the endpin support 1 to a floor surface are provided. The endpin support 1 comes into contact with a floor surface at the portions of the antislip members 7 and the antislip member 8, and a space is formed between the floor surface and the lower plate member 2. The antislip members 7 and the antislip member 8 also play a role in absorbing unnecessary vibrations from the floor surface side.

The lower plate member 2 is in contact with the floor surface only at the portions of the antislip members 7 and the antislip member 8 so as not to be easily influenced by the floor surface side that hardly resonates sounds.

On the bottom surfaces of both ends of the load receiving member 5, antislip members 9 made of rubber to fix the endpin support 1 to the floor surface are provided. The endpin support 1 comes into contact with the floor surface at the portions of the antislip members 9, and a space is formed between the floor surface and the load receiving member 5. The antislip members 9 also play a role in absorbing unnecessary vibrations from the floor surface side.

The load receiving member 5 is in contact with the floor surface only at the portions of the antislip members 9 so as not to be easily influenced by the floor surface side that hardly resonates sounds.

The endpin support 1 includes a vibrancy adjuster 10 that adjusts the volume of the space formed between the lower plate member 2 and the upper plate member 3. The vibrancy adjuster 10 transmits vibrations of sounds of a musical instrument from the upper plate member 3 side to the lower plate member 2 side, and plays a role like a sound post of a violin. The vibrancy adjuster 10 is in contact with the lower plate member 2 and the upper plate member 3, and is formed so as to have a width substantially equal to the width in the short side direction of the lower plate member 2.

The vibrancy adjuster 10 has a knob 11 that is a portion to be gripped when moving the vibrancy adjuster 10 in the longitudinal direction of the main body portion 6.

On the upper surface of the upper plate member 3, a recess 12 to which a tip end of an endpin is fixed and into which the endpin is inserted is provided.

Here, the vibrancy adjuster 10 does not necessarily have to be formed so as to have a width substantially equal to a width in the short side direction of the lower plate member 2. However, from the point that excessive warp of the upper plate 3 due to vibrations can be sufficiently suppressed, the point that projecting portions of the main body portion 6 are eliminated and safety during use is improved, and the point that the volume of the space formed between the lower plate member 2 and the upper plate member 3 can be easily adjusted and vibrancy of sounds can be easily adjusted, the vibrancy adjuster 10 is preferably formed so as to have a width substantially equal to a width in the short side direction of the lower plate member 2.

The vibrancy adjuster 10 does not necessarily have to have the knob 11. However, from the point that the vibrancy adjuster 10 is easily moved, the vibrancy adjuster 10 preferably has the knob 11.

The knob 11 does not necessarily have to be adopted as a structure to move the vibrancy adjuster 10. For example, a structure in which a depression which allows a finger to fit therein is provided on a side surface of the vibrancy adjuster 10 so that the vibrancy adjuster 10 is easily gripped is also possible. In the case where a depression is provided, projecting portions can be reduced in the entire structure, so that the endpin support 1 is easily carried about and safety can be improved.

Figure 2:
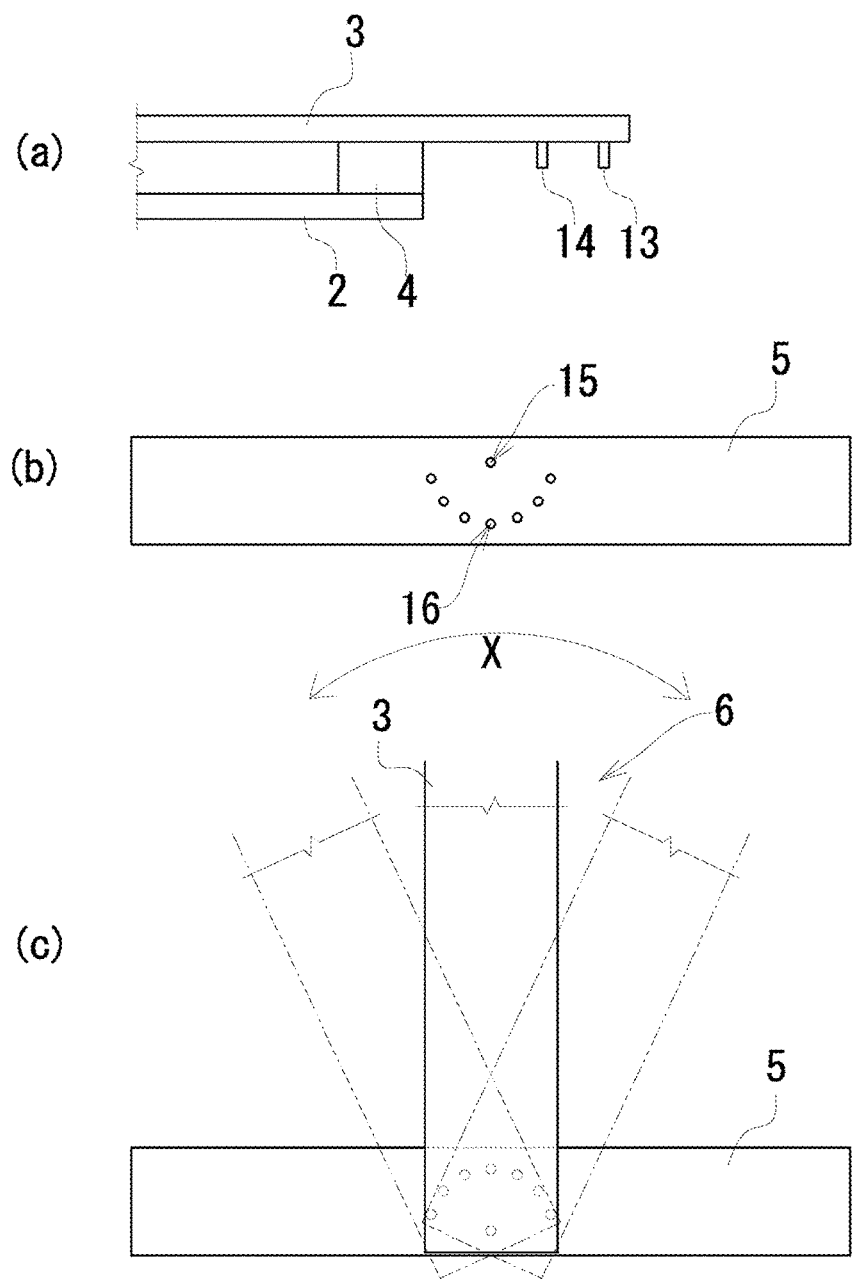
FIG. 2(a) is a schematic side view showing a structure of the other end side of an upper plate member.
FIG. 2(b) is a schematic plan view showing a position of a hole of a load receiving member.
FIG. 2(c) is a schematic plan view showing movement of a main body portion.

As shown in FIG. 2(*a*), on the bottom surface at the other end side of the upper plate member 3, two rod-shaped projecting portion 13 and rod-shaped projecting portion 14 are provided. As shown in FIG. 2(*b*), in the substantially central region of the load receiving member 5, a hole 15 into which the rod-shaped projecting portion 13 is inserted and a plurality of holes 16 into which the rod-shaped projecting portion 14 is inserted are provided.

The upper plate member 3 is attached by inserting the rod-shaped projecting portion 13 and the rod-shaped projecting portion 14 into the hole 15 and the hole 16 of the load receiving member 5. As shown in FIG. 2(*c*), by changing the position of the hole 16 into which the rod-shaped projecting portion 14 is inserted, the orientation of the main body portion 6 can be adjusted. The arrow X in FIG. 2(*c*) shows a movement direction of the main body portion 6.

Here, attachment of the upper plate member 3 to the load receiving member 5 is not limited to the structure using the rod-shaped projecting portions and the holes, and any structure suffices as long as the upper plate member 3 does not easily come off. For example, the contact portion between the upper plate member 3 and the load receiving member 5 may be bonded to form such structure. However, for easy carrying, a structure in which the load receiving member 5 is detachable is preferably used.

The structure in which the orientation of the main body portion 6 is adjustable is not necessarily used. However, from the point that adjustment to an angle suiting a player's preference becomes possible and usability is improved, the structure in which the orientation of the main body portion 6 is adjustable is preferably used.

The structure to adjust the orientation of the main body portion 6 is not limited to the structure using the rod-shaped projecting portions and the plurality of holes. For example, a structure in which, instead of the plurality of holes 16, a groove in which the rod-shaped projecting portion 14 fits is formed, and the rod-shaped projecting portion 14 is slid to an arbitrary position of the groove and clamped and fixed by using a fixture, separately, is also possible.

Figure 3:
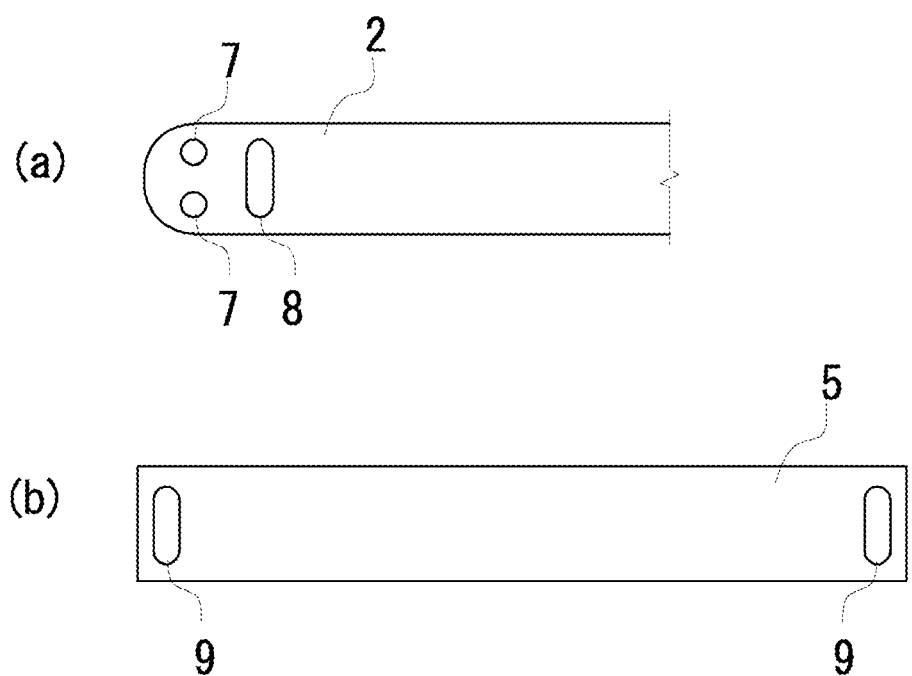
FIG. 3(a) is a schematic view showing antislip portions of a lower plate member.
FIG. 3(b) is a schematic view showing antislip portions of the load receiving member.

As shown in FIG. 3(*a*), on the bottom surface at one end side of the lower plate member 2, the antislip members 7 and the antislip member 8 made of rubber are provided. The antislip members 7 and the antislip member 8 are portions that come into contact with a floor surface, and make the endpin support 1 less likely to slip on the floor surface. Since the lower plate member 2 is provided with the antislip members 7 and the antislip member 8, a space is formed between the lower plate member 2 and a floor surface.

As the antislip members 7, two antislip members having substantially circular shapes in section as viewed from the floor surface are used. As the antislip member 8, an antislip member having a substantially rectangular shape with both ends rounded in section as viewed from the floor surface is used, and is provided so as to have a slight gap with the antislip members 7.

As shown in FIG. 3(*b*), on the bottom surfaces of both ends of the load receiving member 5, antislip members 9 made of rubber are provided. The antislip members 9 are portions that come into contact with a floor surface, and make the endpin support 1 less likely to slip on the floor surface. Since the load receiving member 5 is provided with the antislip members 9, a space is formed between the load receiving member 5 and the floor surface.

As the antislip members 9, antislip members having substantially rectangular shapes with both ends rounded in section as viewed from the floor surface are used.

Here, the two types, the antislip members 7 and the antislip member 8, do not necessarily have to be provided on the bottom surface at one end side of the lower plate member 2. It suffices if the endpin support 1 is fixed, and the antislip member may be provided at only one point. However, from the point that the force to fix the endpin support 1 is increased, two types, the antislip members 7 and the antislip member 8, are preferably provided on the bottom surface at one end side of the lower plate member 2.

The shapes and sizes of the antislip members 7, the antislip member 8, and the antislip members 9 are not especially limited. For example, as a shape that can minimize a contact area between an antislip member and a floor surface, a substantially conical antislip member, the floor surface side of which is formed to be tapered and flat, can be adopted. Accordingly, influences from a floor surface are reduced, and vibrancy of sounds produced by a musical instrument can be sufficiently brought out.

On the other hand, in a case where a high priority is given to the fixing force, it is possible that the positions at which the antislip members are provided are increased. For example, by providing an antislip member on the bottom surface at the other end side of the lower plate member 2, the endpin support 1 can also be made much less likely to slip on a floor surface.

As shown in FIG. 4, in the endpin support 1, the lower plate member 2 is installed on a floor surface via the antislip members 7 and the antislip member 8. In addition, the load receiving member 5 is installed on the floor surface via the antislip members 9. At the portion other than the antislip members 7 and the antislip member 8 of the lower plate member 2, a space is formed between this portion and the floor surface. At the portion other than the antislip members 9 of the load receiving member 5, a space is formed between this portion and the floor surface.

The upper surface portion of the load receiving member 5 which is in contact with the upper plate member 3 is inclined toward the tip end side. Accordingly, a sufficient space is formed between the lower plate member 2 and the floor surface. In addition, a structure in which the upper plate member 3 can be securely supported by the upper surface of the load receiving member 5 is obtained.

Here, the upper surface portion of the load receiving member 5 which is in contact with the upper plate member 3 does not necessarily have to be inclined toward the tip end side. However, from the point that a sufficient space is formed between the lower plate member 2 and the floor surface and the point that the upper plate member 3 can be securely supported by the upper surface of the load receiving member 5 and the load on the endpin support 1 can be received, the upper surface portion of the load receiving member 5 which is in contact with the upper plate member 3 is preferably inclined toward the tip end side.

As shown in FIG. 5, the endpin support 1 has the vibrancy adjuster 10 that adjusts the volume of the space formed between the lower plate member 2 and the upper plate member 3. In addition, a slide groove 17 is formed on the side of the lower plate member 2 in contact with the vibrancy adjuster 10, and the vibrancy adjuster 10 is movable in the slide groove 17 via a guide member 18.

The guide member 18 is joined to a bottom portion of the vibrancy adjuster 10. The arrow Y shown in FIG. 5 shows a movement direction of the vibrancy adjuster 10.

Here, the slide groove 17 and the guide member 18 do not necessarily have to be provided. However, from the point that adjustment of vibrancy of sounds by the vibrancy adjuster 10 becomes easier and the point that the vibrancy adjuster 10 hardly comes off from the portion between the lower plate member 2 and the upper plate member 3, the slide groove 17 and the guide member 18 are preferably provided.

Figure 6:
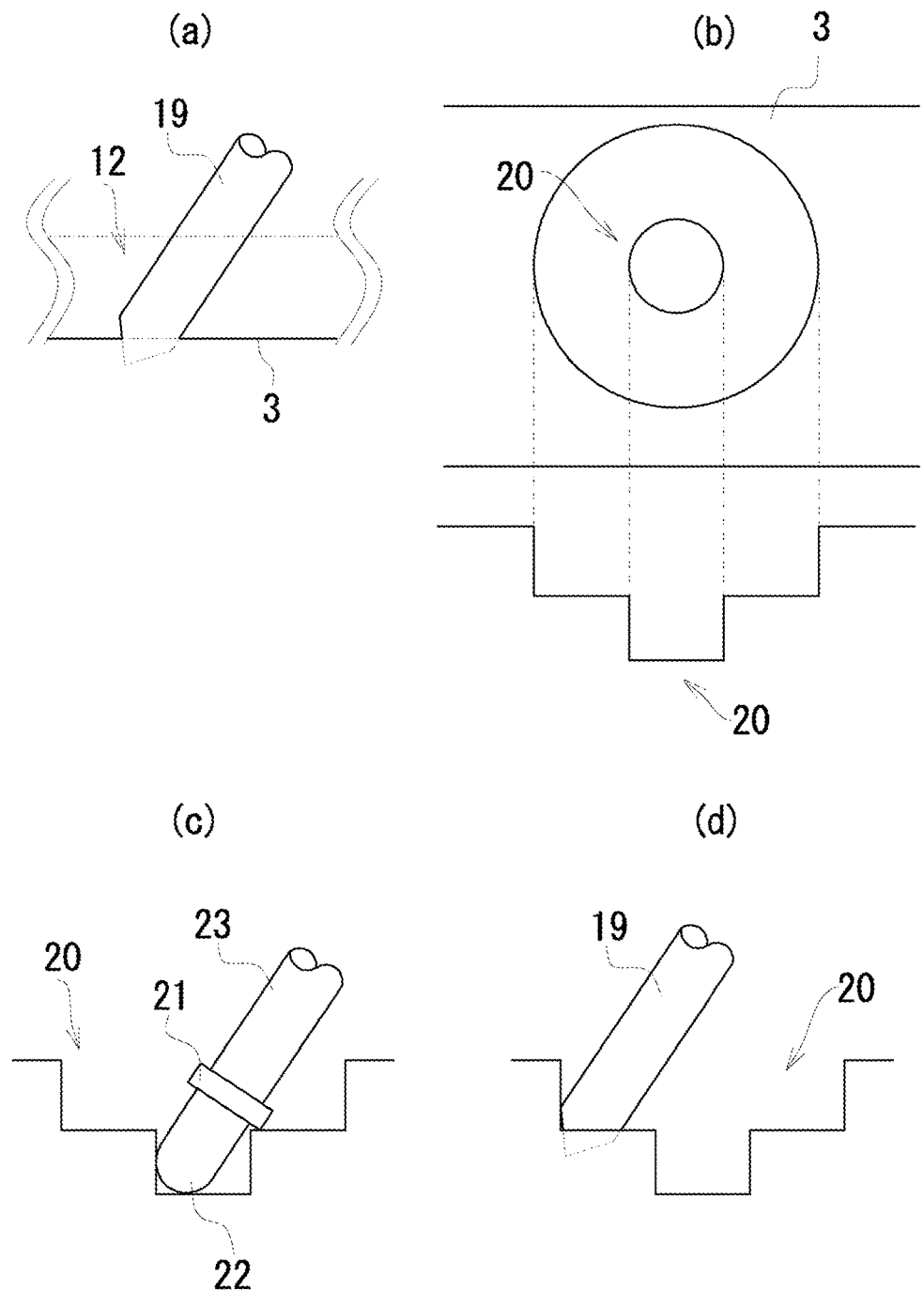
FIG. 6(a) is a schematic view showing a case where an endpin is fixed into a recess.
FIG. 6(b) is a schematic view showing a double hole.
FIG. 6(c) and FIG. 6(d) are schematic views showing cases where an endpin is fixed into the double hole.
Figure 7:
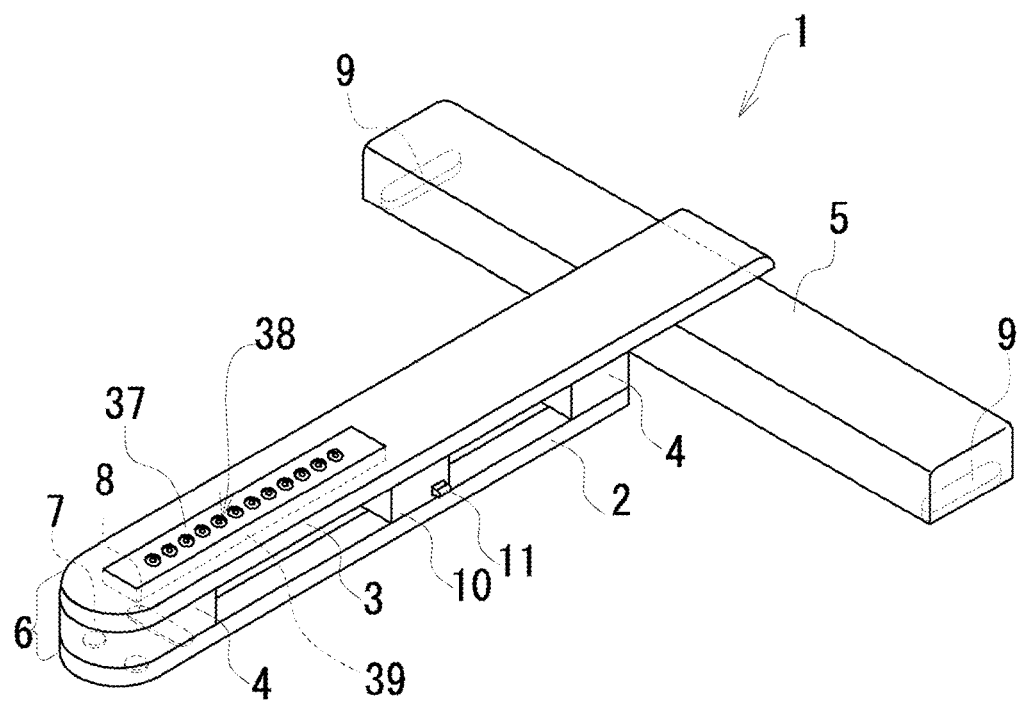
FIG. 7 is a schematic side view showing a musical instrument support using a replaceable endpin receiving member.

FIG. 6(*a*) shows a structure of a recess 12 in which an endpin is inserted provided on an upper surface of the upper plate member 3. When an endpin has a pointed tip end like the endpin 19, the recess 12 is formed to correspond to the size of the endpin 19, and the tip end of the endpin 19 can be stuck into and fixed to the bottom surface of the recess 12.

As another shape of the recess to be provided on the upper surface of the upper plate member 3, a double hole 20 as shown in FIG. 6(*b*) is also possible. The double hole 20 is a hole having two depths with respect to the upper surface of the upper plate member 3.

For example, the endpin 23 as shown in FIG. 6(*c*) is fixed by catching a rounded tip end 22 in the deeper hole portion of the double hole 20. A flange 21 of the endpin 23 is also caught in the shallow hole of the double hole 20.

In addition, as shown in FIG. 6(*d*), in the case of the endpin 19 with a pointed tip end, the tip end sticks in the shallow hole portion of the double hole 20, and accordingly, the endpin 19 is fixed. Thus, by providing the double hole 20 in the upper plate member 3, endpins with various shapes can be sufficiently fixed.

As shown in FIG. 7, in the endpin support 1, as a structure in which an endpin is inserted, a replaceable endpin receiving member 37 can also be adopted. The endpin receiving member 37 is provided with a plurality of double holes 38 to fix a tip end of an endpin.

Figure 8:
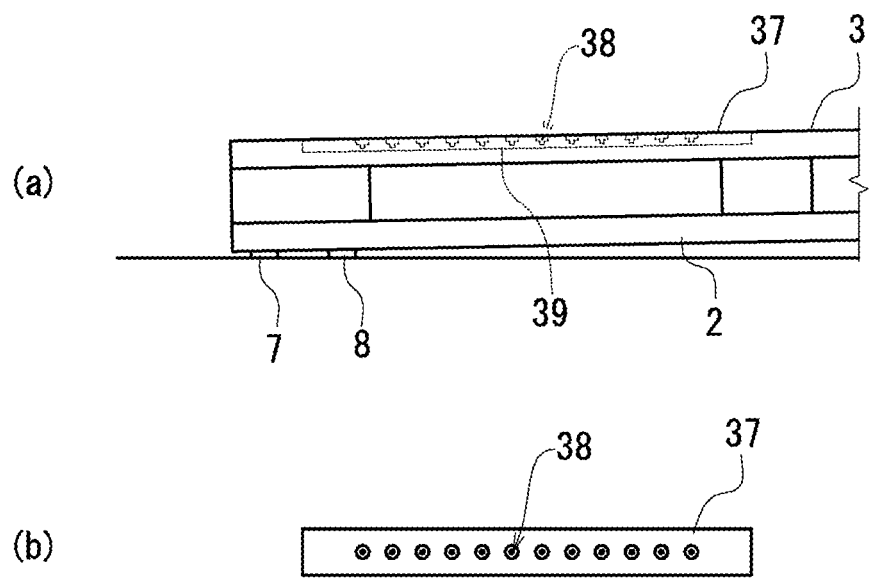
FIG. 8(a) is a schematic side view of a state where a replaceable endpin receiving member is used.
FIG. 8(b) is a plan view of the replaceable endpin receiving member viewed from above.
Figure 9:
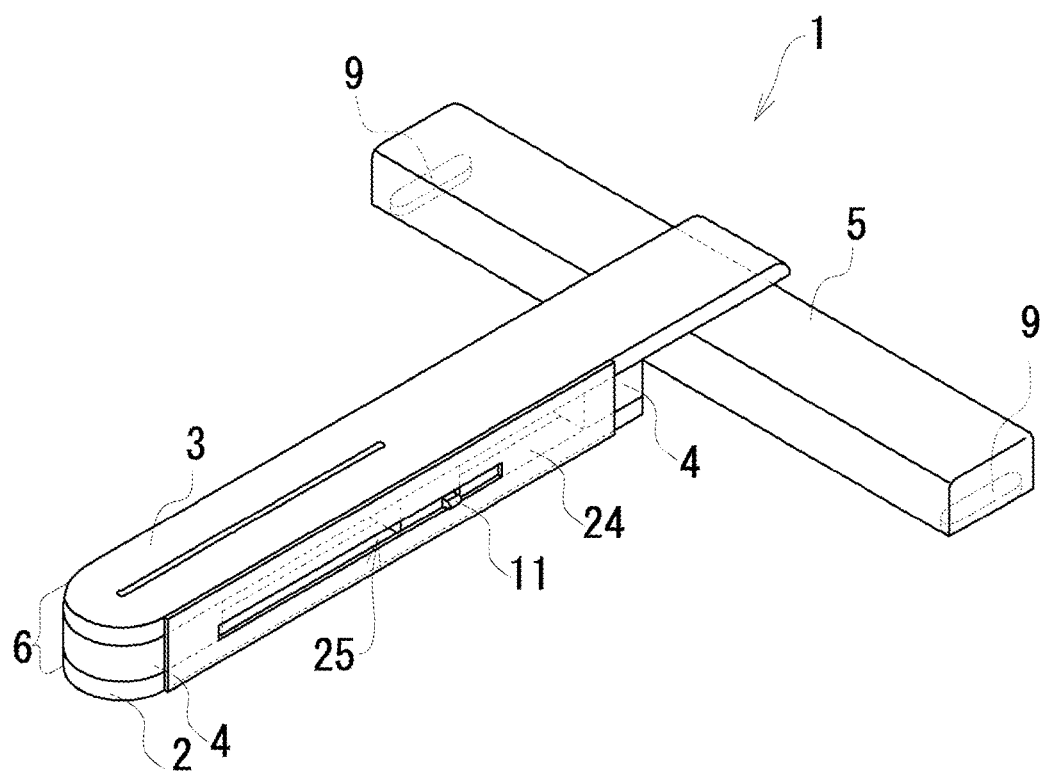
FIG. 9 is a schematic perspective view showing another example of a musical instrument support to which the present invention is applied.

As shown in FIG. 8(*a*), a recess 39 having a shape that the endpin receiving member 37 can fit is provided on the upper plate member 3. FIG. 8(*b*) is a plan view of an endpin receiving member 37, and a plurality of double holes 38 can be formed according to a user's demand.

By adopting the structure including the endpin receiving member 37 and the recess 39, even in a case where shape changes and damage is caused by frequent use of the double holes 38, by just replacing the endpin receiving member 37, the endpin support 1 can be continuously used. In addition, dedicated holes according to the types of a musical instrument and an endpin can be easily provided, so that a musical instrument support having broad utility can be realized.

FIG. 9 shows another embodiment of the main body portion 6 of the endpin support 1.

As shown in FIG. 9, side plate members 24 are provided on both side surfaces of the main body portion 6 of the endpin support 1. The side plate members 24 cover the space formed between the lower plate member 2 and the upper plate member 3, and in a region thereof, side plate groove portions 25 in which the knob 11 of the vibrancy adjuster 10 is movable are provided.

By transmitting vibrations of sounds of a musical instrument to the side plate members 24, the side plate members 24 resonate with the sounds, and the vibrancy of sounds can be amplified. In addition, the side plate members 24 are provided in contact with the lower plate member 2, the upper plate member 3, and the middle plate members 4, and improve the strength of the main body portion 6.

Here, the side plate members 24 do not necessarily have to be provided on both side surfaces of the main body portion 6. However, as described above, from the point that the vibrancy of sounds can be amplified and the point that the strength of the main body portion 6 can be improved, the side plate members 24 are preferably provided on both side surfaces of the main body portion 6.

Hereinafter, a usage mode of the musical instrument support to which the present invention is applied is described with reference to the drawings for understanding of the present invention.

Figure 10:
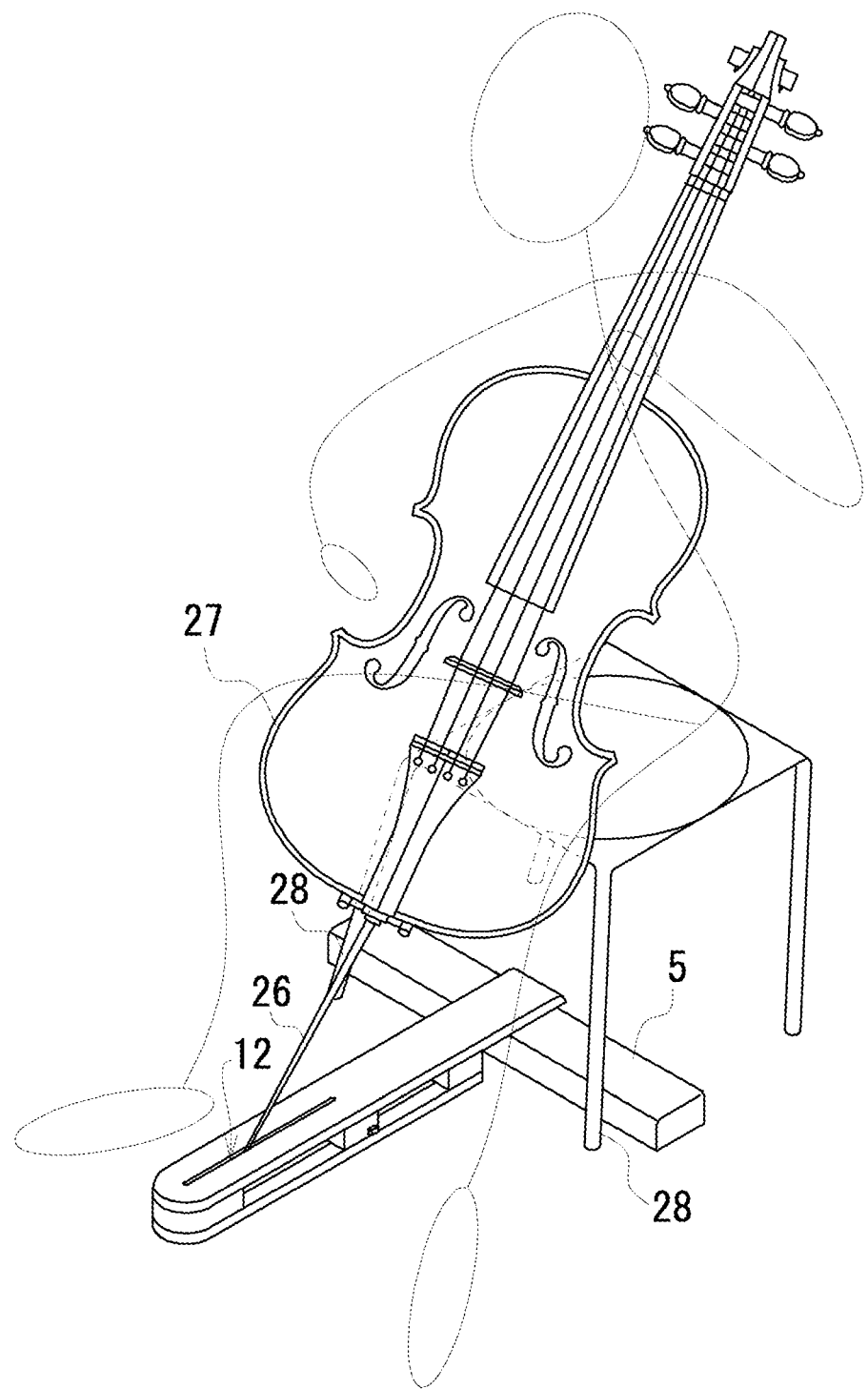
FIG. 10 is a schematic view showing a usage state of the musical instrument support.

FIG. 10 is a schematic view showing a usage state of the musical instrument support.

As shown in FIG. 10, a player of a musical instrument 27 having an endpin 26, such as a cello, sits on a chair and plays the musical instrument.

First, the load receiving member 5 of the endpin support 1 is brought into contact with legs 28 of the chair from the rear side of the chair. At this time, when the chair has the shape shown in FIG. 10, the endpin support 1 is disposed so that the main body portion 6 is positioned between the legs 28 of the chair.

Next, the endpin 26 is inserted in the recess 12 of the upper plate member 3 of the main body portion 6, and is fixed by being stuck into the upper plate member 3. A position to which the endpin 26 is fixed may be an arbitrary position that the player desires, so that a position that makes it easier for the player to play the musical instrument and sufficiently support the musical instrument can be selected.

The endpin 26 tilts obliquely downward from the front side as viewed from the player. Therefore, a force of a load to displace the endpin support 1 forward on the floor surface is applied to the endpin support 1. Here, since the load receiving member 5 is latched onto the legs 28 of the chair, the endpin support 1 can be made less likely to slip.

The antislip members 7, the antislip member 8, and the antislip members 9 made of rubber are provided on the bottom surfaces of the lower plate member 2 and the load receiving member 5 although these are not shown, so that the endpin support 1 hardly slips on the floor surface and is hardly displaced.

Subsequently, a flow of transmission of vibrations of sounds is described. First, vibrations of sounds produced from the musical instrument are transmitted to the upper plate member 3 through the endpin 26. Next, the vibrations of sounds are transmitted from the upper plate member 3 to the lower plate member 2 via the middle plate members 4 and the vibrancy adjuster 10. At this time, due to the space formed between the lower plate member 2 and the upper plate member 3, the vibrancy of the sounds is hardly deteriorated. In addition, by minimizing contact between the lower plate member 2 and the floor surface, the vibrations of the musical instrument itself are hardly confined by the floor surface.

The player can adjust the vibrancy of the sounds to be produced via the endpin support 1 by changing the position of the vibrancy adjuster 10. For comfortable playing, the vibrancy of sounds that the player feels by himself/herself is also important.

In addition, the player can adjust the orientation of the main body portion 6 according to his/her preference by changing the attaching position of the upper plate member 3 to the load receiving member 5.

A musical instrument that can use the endpin support 1 to which the present invention is applied is not especially limited. The endpin support 1 can be used for any musical instrument as long as the musical instrument is supported by an endpin, such as a cello, a contrabass, a contrabassoon, and a bass clarinet.

Thus, the musical instrument support to which the present invention is applied is hardly influenced by a floor surface while securely fixing a musical instrument, and can sufficiently bring out vibrancy of sounds produced by the musical instrument itself.

Subsequently, hereinafter, an embodiment of the present invention relating to a sound source body support is described with reference to the drawings for understanding of the present invention.

Figure 11:
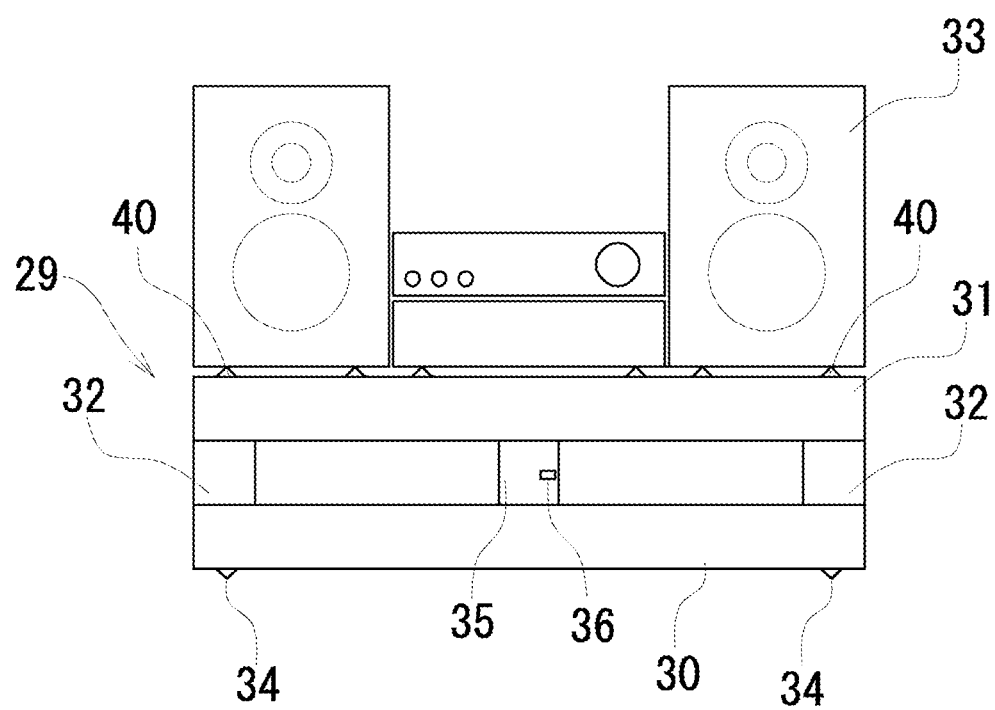
FIG. 11 is a schematic view showing a structure and a usage state of a sound source body support.
Figure 12:
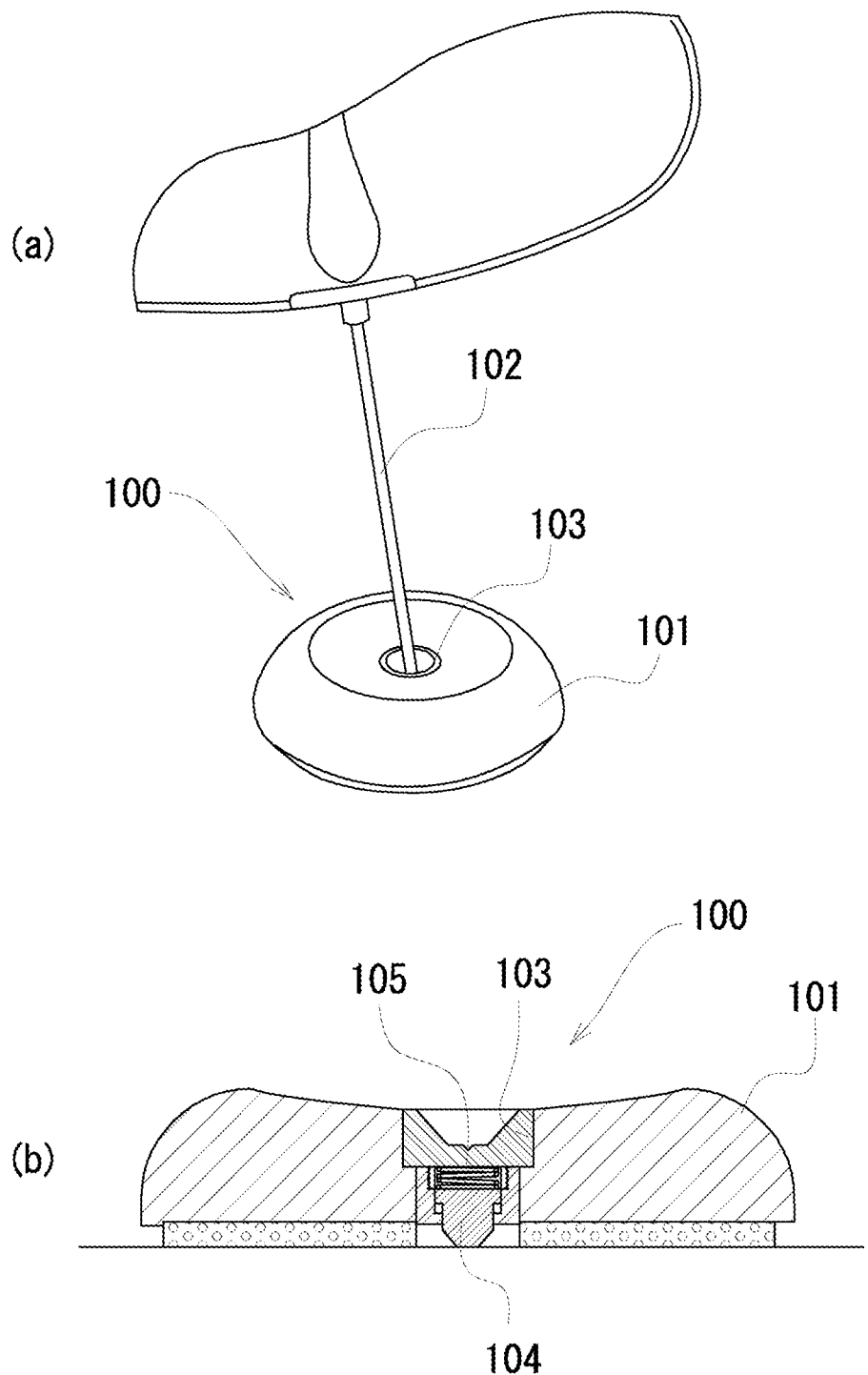
FIG. 12(a) is a schematic view of a usage state of a conventional musical instrument support.
FIG. 12(b) is a schematic view of the musical instrument support.

FIG. 11 is a schematic view showing a structure and a usage state of a sound source body support.

Here, as shown in FIG. 11, a speaker support 29 as an example of a sound source body support to which the present invention is applied includes a lower plate member 30, an upper plate member 31, and middle plate members 32.

The lower plate member 30 is a portion that vibrates by resonating with sounds of the speaker 33 to spread vibrancy of the sounds. The lower plate member 30 and the upper plate member 31 are joined by two middle plate members 32 provided on both ends, and a space is formed between the lower plate member 30 and the upper plate member 31. The speaker support 29 has a substantially rectangular parallelepiped shape long in the right-left direction as viewed from the front.

On the upper surface of the upper plate member 31, support parts 40 are provided, and on the support parts 40, a sound source body such as a speaker 33 can be placed. The support part 40 is formed into a substantially conical shape tapered toward the upper side on which a sound source body is placed.

The lower plate member 30, the upper plate member 31, and the middle plate members 32 are formed to have widths in the short side direction substantially equal to one another. The lower plate member 30, the upper plate member 31, and the middle plate members 32 are made of wood.

Here, the speaker support 29 does not necessarily have to be formed by joining the lower plate member 30 and the upper plate member 31 by the middle plate members 32. For example, the lower plate member 30, the upper plate member 31, and the middle plate members 32 may be integrally formed.

Two middle plate members 32 do not necessarily have to be provided at both ends of the lower plate member 30 and the upper plate member 31. However, from the point that the volume of the space between the lower plate member 30 and the upper plate member 31 is increased, and the effect of preventing vibrancy of sounds from being deteriorated by the members can be increased, two middle plate members 32 are preferably provided at both ends of the lower plate member 30 and the upper plate member 31.

The shape of the upper surface of the upper plate member 31 is not especially limited, and any shape suffices as long as the upper surface is formed so as to allow a desired sound source body to be placed thereon.

The speaker support 29 does not necessarily have to have a substantially rectangular parallelepiped shape. The speaker support 29 can be formed to have a shape corresponding to a size of a sound source body to be placed thereon.

The lower plate member 30, the upper plate member 31, and the middle plate members 32 do not necessarily have to be formed to have widths in the short side direction substantially equal to one another. However, from the point that irregularities of the shape of the speaker support 29 are reduced and safety is improved, and the point that the appearance is improved, the lower plate member 30, the upper plate member 31, and the middle plate members 32 are preferably formed to have widths in the short side direction substantially equal to one another.

The lower plate member 30, the upper plate member 31, and the middle plate members 32 do not necessarily have to be made of wood. However, from the point that, as compared with the case where they are made of a material such as a metal, the quality of sounds produced from a speaker or the like is hardly changed, the lower plate member 30, the upper plate member 31, and the middle plate member 32 are preferably made of wood.

The upper plate member 31 does not necessarily have to be provided with the support parts 40, and it suffices as long as a sound source body can be placed on the upper plate member 31. However, from the point that the contact area between the upper plate member 31 and a sound source body is reduced, and original vibrancy of sounds of the sound source body can be made less likely to deteriorate, the upper plate 31 is preferably provided with the support parts 40.

The size and shape of the support part 40 are not especially limited. However, from the point that the contact area between the upper plate member 31 and a sound source body can be reduced and the vibrancy of sounds can be made less likely to deteriorate, and the point that a sound source body can be securely placed on the upper plate member 31, the support part 40 is preferably formed to have a substantially conical shape tapered toward the upper side on which a sound source body is placed.

The number of support parts 40 to be provided can be changed according to a structure of a sound source body to be placed thereon.

The speaker support can also be formed in accordance with a structure of a speaker. For example, it is possible that the speaker support is formed to have a size that enables separated speaker and operation main body portion to be placed separately.

As shown in FIG. 11, antislip members 34 made of rubber to fix the speaker support 29 to a floor surface are provided on the bottom surfaces at both end sides of the lower plate member 30. The speaker support 29 comes into contact with a floor surface at the portions of the antislip members 34, and a space is formed between the floor surface and the lower plate member 30. The antislip members 34 also play a role in absorbing unnecessary vibrations from the floor surface side.

The antislip member 34 is formed into a substantially conical shape, the floor surface side of which is formed to be tapered and flat.

The speaker support 29 includes a vibrancy adjuster 35 that adjusts the volume of the space formed between the lower plate member 30 and the upper plate member 31. The vibrancy adjuster 35 transmits vibrations of sounds of a speaker from the upper plate member 31 side to the lower plate member 30 side. The vibrancy adjuster 35 is in contact with the lower plate member 30 and the upper plate member 31, and formed so as to have a width substantially equal to the width in the short side direction of the lower plate member 30.

The vibrancy adjuster 35 has a knob 36 that is a portion to be gripped when moving the vibrancy adjuster 35.

Here, the antislip member 34 does not necessarily have to be formed into a substantially conical shape, the floor surface side of which is formed to be tapered and flat. However, from the point that the contact area between the speaker support 29 and the floor surface is reduced and the speaker support 29 becomes less likely to be influenced by the floor surface, the antislip member 34 is preferably formed into a substantially conical shape, the floor surface side of which is formed to be tapered and flat.

The vibrancy adjuster 35 does not necessarily have to be formed to have a width substantially equal to the width in the short side direction of the lower plate member 30. However, from the point that warp of the upper plate member 31 due to vibrations can be sufficiently suppressed, the point that irregular portions of the speaker support 29 are reduced and safety is improved, and the point that it becomes easier to adjust the volume of the space formed between the lower plate member 30 and the upper plate member 31 and adjustment of the vibrancy of sounds becomes easier, the vibrancy adjuster 35 is preferably formed to have a width substantially equal to the width in the short side direction of the lower plate member 30.

In a case where the lengths in the longitudinal directions of the lower plate member 30 and the upper plate member 31 are formed to be short, warp of the upper plate member 31 due to vibrations does not occur, and a stable structure can be obtained.

The vibrancy adjuster 35 does not necessarily have to have the knob 36. However, from the point that movement of the vibrancy adjuster 35 becomes easier, the vibrancy adjuster 35 preferably has the knob 36.

Hereinafter, a usage mode of a sound source body support to which the present invention is applied is described.

As shown in FIG. 11, a sound source body such as a speaker 33 is placed on the speaker support 29.

Vibrations of sounds produced from the speaker 33 are transmitted to the upper plate member 31. Next, the vibrations of the sounds are transmitted from the upper plate member 31 to the lower plate member 30 via the middle plate members 32 and the vibrancy adjuster 35. At this time, due to the space formed between the lower plate member 30 and the upper plate member 31, vibrancy of the sounds is hardly deteriorated. In addition, by minimizing contact between the lower plate member 30 and the floor surface, vibrations of the speaker itself are hardly confined by the floor surface.

By changing the position of the vibrancy adjuster 35, the vibrancy of the sounds produced via the speaker support 29 can be adjusted.

Thus, the sound source body support to which the present invention is applied is hardly influenced by a floor surface while securely fixing a sound source body, and can sufficiently bring out vibrancy of sounds produced by the sound source body itself.

As described above, a musical instrument support to which the present invention is applied is hardly influenced by a floor surface while securely fixing a musical instrument, and can sufficiently bring out vibrancy of sounds produced by the musical instrument itself.

In addition, a sound source body support to which the present invention is applied is hardly influenced by a floor surface while securely fixing a sound source body, and can sufficiently bring out vibrancy of sounds produced by the sound source body itself.

REFERENCE SIGN LIST

1 Endpin support
2 Lower plate member
3 Upper plate member
4 Middle plate member
5 Load receiving member
6 Main body portion
7 Antislip member
8 Antislip member
9 Antislip member
10 Vibrancy adjuster
11 Knob
12 Recess
13 Rod-shaped projecting portion
14 Rod-shaped projecting portion
15 Hole
16 Plurality of holes
17 Slide groove
18 Guide member
19 Endpin
20 Double hole
21 Flange
22 Rounded tip end
23 Endpin
24 Side plate member
25 Side plate groove portion
26 Endpin
27 Musical instrument
28 Leg of chair
29 Speaker support
30 Lower plate member
31 Upper plate member
32 Middle plate member
33 Speaker
34 Antislip member
35 Vibrancy adjuster
36 Knob
37 Endpin receiving member
38 Double hole
39 Recess
40 Support part
Arrow X Movement direction of main body portion
Arrow Y Movement direction of vibrancy adjuster

The invention claimed is:

1. A restraint item for an endpin of a musical instrument comprising:
   a lower plate member;
   an upper plate member that is provided so as to have a predetermined gap with the lower plate member and can receive the endpin;
   middle plate members that are in contact with the lower plate member and the upper plate member and disposed in a portion of the gap between the lower plate member and the upper plate member;
   a first antislip member with elasticity provided on a side of the lower plate member opposite to the middle plate members;
   a load receiving member connected to the upper plate member and constructed to be latched onto legs of a chair; and
   a second antislip member with elasticity provided on the load receiving member,
   wherein the lower plate member and the upper plate member are formed into elongate planar shapes.

2. The restraint item according to claim 1, further comprising: a vibrancy adjuster that is in contact with the lower plate member and the upper plate member and positioned between the middle plate members, and is movable in a space that is between the middle plate members.

3. The restraint item according to claim 1, wherein the load receiving member is formed into an elongate planar shape, and wherein an angle of a connection position between the upper plate member and the load receiving member is variable.

4. The restraint item according to claim 1, further comprising: side plate members that are substantially parallel to each other and have substantially equal lengths, and are connected to the lower plate member, the upper plate member, and the middle plate members.

5. The restraint item according to claim 1, wherein the upper plate member has a recess formed on a top surface of the upper plate member to receive the endpin.

6. The restraint item according to claim 1, wherein the load receiving member is formed into an elongate planar shape.

7. The restraint item according to claim 2, wherein the load receiving member is formed into an elongate planar shape, and wherein an angle of a connection position between the upper plate member and the load receiving member is variable.

8. The restraint item according to claim 2, further comprising: side plate members that are substantially parallel to each other and have substantially equal lengths, and are connected to the lower plate member, the upper plate member, and the middle plate members.

9. The restraint item according to claim 2, wherein the upper plate member has a recess formed on a top surface to receive the endpin.

10. The restraint item according to claim 2, wherein the load receiving member is formed into an elongate planar shape.

11. A stand for a stereo or speaker comprising:
    a lower plate member;
    an upper plate member which is provided so as to have a predetermined gap with the lower plate member, and on which the stereo or speaker can be placed;
    middle plate members that are in contact with the lower plate member and the upper plate member and disposed in a portion of the gap between the lower plate member and the upper plate member;
    a vibrancy adjuster that is in contact with the lower plate member and the upper plate member and positioned between the middle plate members, and is movable in a space that is between the middle plate members; and
    an antislip member with elasticity provided on a side of the lower plate member opposite to the middle plate members.

* * * * *